(12) United States Patent
Cousin (10) Patent No.: US 6,725,357 B1
(45) Date of Patent: Apr. 20, 2004

(54) MAKING AVAILABLE INSTRUCTIONS IN DOUBLE SLOT FIFO QUEUE COUPLED TO EXECUTION UNITS TO THIRD EXECUTION UNIT AT SUBSTANTIALLY THE SAME TIME

(75) Inventor: Jean-Philippe Cousin, Grenoble (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/563,477

(22) Filed: May 2, 2000

(30) Foreign Application Priority Data

May 3, 1999 (EP) ............................................ 99410060

(51) Int. Cl.[7] ................................................ G06F 9/38
(52) U.S. Cl. ...................... 712/214; 712/24; 712/213; 712/215
(58) Field of Search ................................ 712/214, 215, 712/24, 213

(56) References Cited

U.S. PATENT DOCUMENTS

| | | | | |
|---|---|---|---|---|
| 5,115,496 A | * | 5/1992 | Nomura | 711/212 |
| 5,241,644 A | * | 8/1993 | Nomura et al. | 710/54 |
| 5,560,028 A | | 9/1996 | Sachs et al. | 395/800 |
| 5,617,549 A | | 4/1997 | DeLano | 395/382 |
| 5,974,537 A | * | 10/1999 | Mehra | 712/215 |
| 6,304,953 B1 | * | 10/2001 | Henstrom et al. | 712/215 |

FOREIGN PATENT DOCUMENTS

| | | |
|---|---|---|
| EP | 0 667 571 | 8/1995 |
| EP | 0 690 373 | 1/1996 |

* cited by examiner

*Primary Examiner*—Kenneth S. Kim
(74) *Attorney, Agent, or Firm*—Lisa K. Jorgenson; James H. Morris; Wolf, Greenfield & Sacks, P.C.

(57) ABSTRACT

A system comprises: a first execution unit, a second execution unit and a third execution unit; a first-in-first-out memory arranged to receive a plurality of instructions for the first to third execution units and to output the instructions to the execution units; a memory store for storing at least one instruction for one of the execution units, the at least one instruction being received from the first-in-first-out memory, the first and second execution units being arranged to receive their instructions from the first-in-first-out memory and the third execution unit being arranged to receive the instructions from the memory store, wherein a given instruction for the third execution unit is available to the third execution unit at substantially the same time that the instruction would be available to the first or second execution unit if that instruction was for the first or second execution unit.

24 Claims, 6 Drawing Sheets

MAKING AVAILABLE INSTRUCTIONS IN DOUBLE SLOT FIFO QUEUE COUPLED TO EXECUTION UNITS TO THIRD EXECUTION UNIT AT SUBSTANTIALLY THE SAME TIME

FIELD OF THE INVENTION

The present invention relates to a system and in particular but not exclusively to a system for use in a computer system.

BACKGROUND OF THE INVENTION

Figure 5:
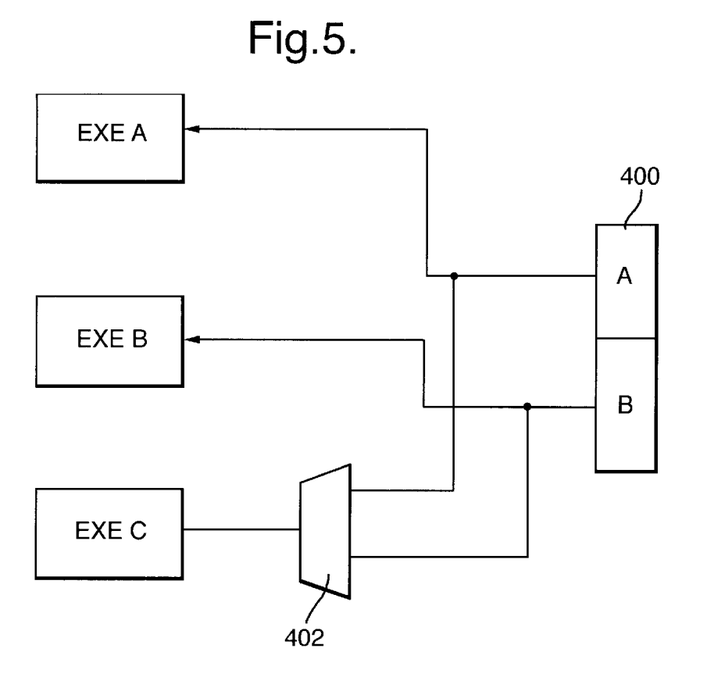
FIG. 5 shows an arrangement whereby the address units and the general unit share a common first-in-first-out buffer with timing difficulties.

Reference will now be made to FIG. 5 which shows an arrangement considered by the present applicant. This Figure shows three execution units EXE A, EXE B and EXE C which are arranged to receive instructions from a first-in-first-out buffer of which one array 400 is shown. Each array 400 has two slots A and B. The first slot A can have instructions for the first execution unit EXE A or the third execution unit EXE C. The second slot B can have instructions for the second execution unit EXE B or the third execution unit EXE C. The output of the first slot A is input to the first execution unit EXE A and to a multiplexer 402. Likewise the output of the second slot B is input to the second execution unit EXE B and to the multiplexer 402. The output of the multiplexer 402 is input to the third execution unit EXE C.

When the first and second slots A and B contain instructions for the first and second execution unit EXE A and B, the instructions are output to these execution units at the beginning of a clock cycle. The execution units thus have and are able to act on these instructions at the beginning of that clock cycle. If, however, the instructions are intended for the third execution unit EXE C the instructions are output at the beginning of the multiplexer 402 and then to the third execution unit EXE C. This means that the instructions will not be available to the third execution unit EXE C at the beginning of the clock cycle. This can cause timing problems.

Figure 6A:
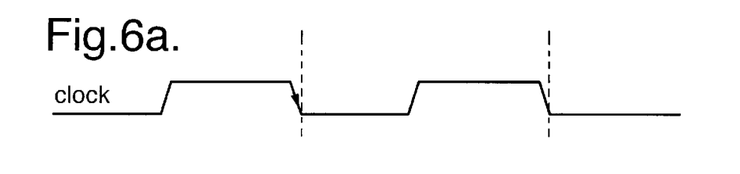
FIG. 6 shows the timing of the arrangement of FIG. 5.
Figure 6B:
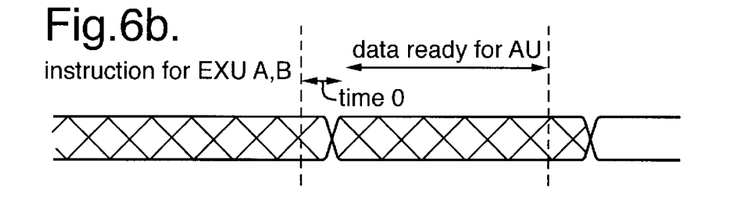
Figure 6C:
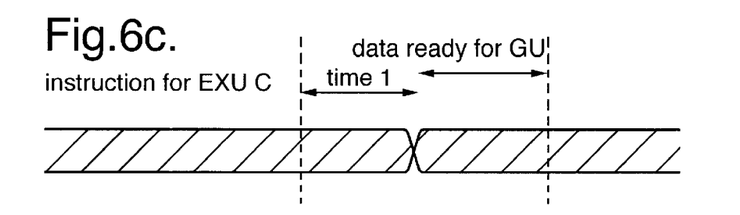

Reference is made to FIG. 6 which shows the timing for the circuit of FIG. 5. FIG. 6a shows the clock signal. FIG. 6b shows the timing of data for the first and second execution units EXE A and EXE B. FIG. 6c shows the timing of data for the third execution unit EXE C. As can be seen from FIG. 6b, time 0 represents the time taken for data to arrive at the first and second execution unit EXE A,B. FIG. 6c shows the delay introduced by the multiplexer 402. This time represents the time taken for data to arrive at the third execution unit.

As shown in FIG. 6 time is wasted in driving the multiplexer 402 to send data to the third execution unit EXE C. As a result not as many operations can be performed on data in the third execution unit EXE C as compared to the first and second execution units EXE A and B.

SUMMARY OF THE INVENTION

It therefore an aim of embodiments of the present invention to address these problems.

According to one aspect of the present invention, there is provided a system comprising: a first execution unit, a second execution unit and a third execution unit; a first-in-first-out memory arranged to receive a plurality of instructions for said first to third execution units and to output said instructions to the execution units; a memory store for storing at least one instruction for one of said execution units, said at least one instruction being received from said first-in-first-out memory, said first and second execution units being arranged to receive their instructions from said first-in-first-out memory and said third execution unit being arranged to receive said instructions from said memory store, wherein a given instruction for said third execution unit is available to the third execution unit at substantially the same time that the instruction would be available to the first or second execution unit if that instruction was for said first or second execution unit.

In this way the timing problems of the arrangement shown in FIG. 5 can be avoided.

Preferably, said first-in-first-out memory comprises a plurality of memory arrays, said memory array for storing instructions. Each array may comprise a first slot and a second slot each of which is able to store separate instructions. A first of said slots may contain instructions for said first execution unit and the second of said slots may contain instructions for said second execution unit. The third execution unit may be arranged to receive instructions from both of said slots. An instruction for said third execution unit may comprise instructions in said first and second slots.

Preferably, at least one of said first and second slots contains information identifying the execution unit for which the instruction is intended. In preferred embodiments of the invention, both of the slots contain information identifying the execution unit for which the instruction is intended.

Switch means may be provided between a first of said arrays and a second of said arrays for directing instructions to said first array and said memory store. The switch means may comprise at least one multiplexer. Preferably two multiplexers are provided, said first multiplexer being connected to the first slot of the first array and the second multiplexer being connected to the second slot of said array. The output of said first and second multiplexers may be output to said memory store.

Preferably, the output of said switch means is arranged to be input to a further switch means the output of which is connected to said memory store, said further switch means being arranged to pass only instructions intended for said third execution unit to said memory store. The further switch means may comprise a multiplexer. The memory store may be arranged to store only a single instruction. The memory store may be a flip flop.

The execution units are arranged to carry out pipelined operations in accordance with the instructions. Preferably, said first and second execution units are of one type and said third execution unit is of a second, different type. Instructions for said first to third execution units may be available at the beginning of a clock cycle.

According to a second aspect of the present invention there is provided an integrated circuit incorporating the above system.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF EMBODIMENTS OF THE INVENTION

Figure 1:
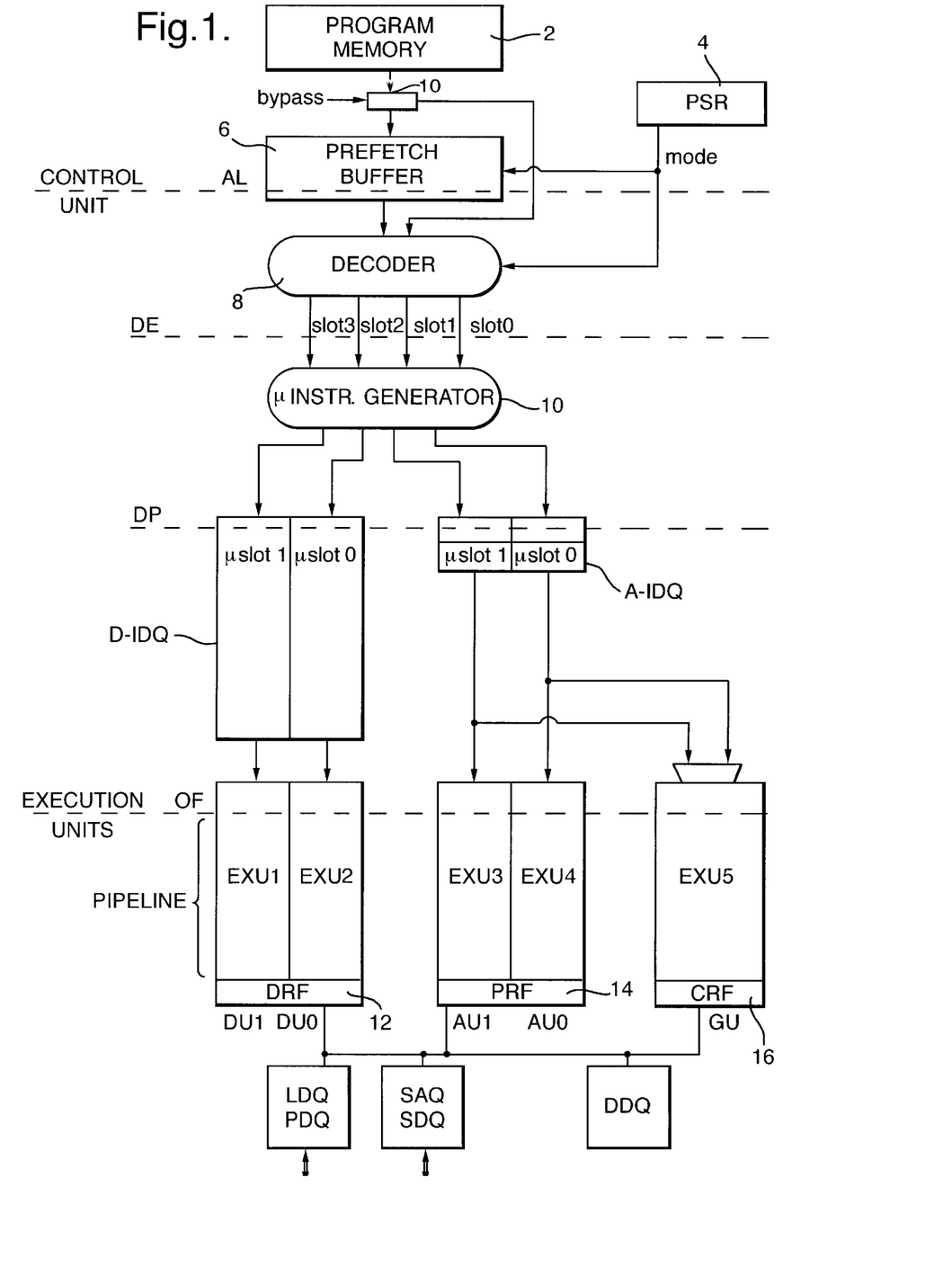
FIG. 1 shows a schematic diagram of components of a computer system.

FIG. 1 illustrates relevant components of a computer system arranged for the parallel execution of a plurality of instructions and is particularly suited to provide a high digital signal processing (DSP) performance. A programme memory 2 holds instructions in one of a number of different instruction formats. Programme code can be written in instructions of any one or a combination of GP16 format, GP32 format and very long instruction word (VLIW) format. Thus, individual instructions in the programme memory 2 can have a length of 16 bits or 32 bits. The computer system supports three different instruction modes as discussed with reference to FIG. 2 hereinafter. The instruction mode of the computer system is held in a process status register (PSR) 4 and is used to control operations of the prefetch buffer 6 and a decoder 8. A bypass mechanism 10 allows instructions to be supplied directly from the programme memory 2 to the decoder 8 in some circumstances.

According to the instruction mode of the system, a number (2 or 4) of instructions are fetched from the programme memory 2 either directly or via the prefetch buffer 6 and supplied to the decoder 8. Decoded instructions are supplied through a micro-instruction generator 10 which generates micro-instructions for a plurality of parallel execution units which are labelled EXU1, EXU2, EXU3, EXU4 and EXU5 in FIG. 1. Each execution unit is arranged as an execution pipe line and arranged to have particular functions as follows. Execution units EXU1 and EXU2 are data units which are arranged to execute micro-instructions carrying arithmetic operations. They are also labelled DU1 and DU0. The first and second execution units EXU1 and EXU2 share a common data register file 12. The third-and fourth execution units EXU3 and EXU4 are address units and are used to execute micro-instructions for memory accesses to a data memory (not shown). The third and fourth execution units EXU3 and EXU4 are also labelled AU1 and AU0. The address units EXU3 and EXU4 share a common pointer register file 14. The remaining execution unit EXU5 is a general unit (GU) which shares some resources with the address units but which includes its own control register file 16.

A load data queue LDQ and pointer data queue PDQ provide a queuing mechanism for data pointers from the data memory to the register files 12, 14 and 16. A store address/data queue SAQ/SDQ provide a query mechanism for data and addresses awaiting access to memory. A data Queue DDQ allows queues of data to be transferred between the register files 12, 14 and 16.

The data units DU0, DU1, address units AU0, AU1 and general unit GU are fed from instruction queues which receive micro-instructions from the micro-instruction generator 10. Micro-instructions are generated in μ slot 0, μ slot 1 for the data units DU0 and DU1 respectively and those micro-instructions are held in the instruction data queue D-IDQ in readiness for supply to the pipelined data units DU1 and DU0. Likewise, micro-instructions are generated in μ slot 0 and μ slot 1 for the address units and general unit AU1, AU0 and GU. These micro-instructions are held in an instruction data queue A-IDQ for the address units.

The prefetch buffer 6, decoder 8, micro-instruction generator 10 and instruction queues D-IDQ and A-IDQ constitute a control unit for the computer system which operates in a pipelined manner. The stages of the pipeline are marked using dotted lines in FIG. 1 and,are denoted as follows:

AL—align stage

DE—decode stage

DP—dispatch stage.

Similarly, each of the execution units are pipelined, although details of the pipelining are not given here. The first stage in each pipeline however is an operand fetch (OF) stage which provides operands for use by the instructions in execution by the execution units.

The micro-instruction generator 10 dispatches micro-instructions to the queues D-IDQ, A-IDQ in a format which depends on the execution unit for which the micro-instructions are intended. Thus, there is a micro-instruction format for the data units, a micro-instruction format for the address units and a micro-instruction format for the general unit. Micro-instructions are generated in these formats, independently of the instruction mode used to write the programme code. In order to explain this, the three different instruction modes of the machine will first be described with reference to FIG. 2.

Figure 2:
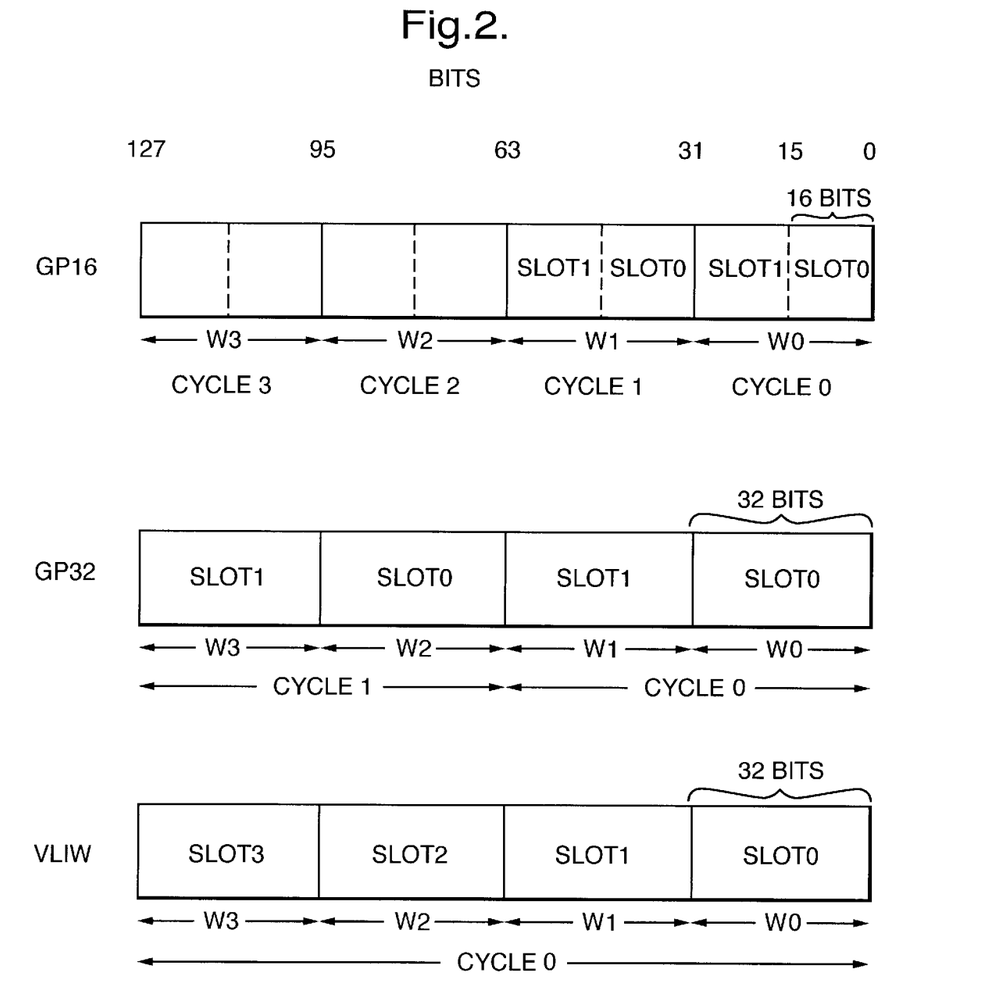
FIG. 2 illustrates three different instruction modes.

According to a first instruction mode, a pair of 16 bit instructions are supplied during each machine cycle to the decoder 8 from the prefetch buffer 6. This pair is denoted slot 0, slot 1 in bit sequences W0, W1 etc. This is referred to herein as GP16 superscaler mode.

According to a second instruction mode, two instructions each having a length of 32 bits are supplied to the decoder from the prefetch buffer in each machine cycle, for example W0, W1 in the cycle 0. This mode is referred to herein as the GP32 superscaler mode.

According to a third instruction mode, four instructions W0, W1, W2, W3 each of 32 bits in length are supplied to the decoder in each machine cycle. This is referred to herein as the VLIW mode.

In all modes, each fetch operation initiated to the programme memory 2 retrieves an instruction word of 128 bits in length. Thus in GP16 mode, the instruction word comprises eight 16 bit instructions, paired as slot 0, slot 1 for each machine cycle. In GP32 and VLIW mode, the instruction word comprises four 32 bit instructions.

Thus, decoded instructions supplied from the decoder 8 to the micro-instruction generator 10 are supplied by four possible channels, labelled slot 0, slot 1, slot 2 and slot 3. Slot 2 and slot 3 will only be used in the VLIW mode. It will be appreciated that each program instruction can give rise to a number of micro-instructions depending on the nature of the program instruction. Moreover, a single program instruction can give rise to micro-instructions for both the data units and the address and general units.

In GP16 and GP32 mode, only slot 0 and slot 1 are used during each machine cycle. These are used to generate micro-instructions in each μ slot 0 and μ slot 1 of either the data units DU0 and DU1 or the address units AU0 and AU1/general unit GU. An instruction in slot 0 can give rise to a micro-instruction in μ slot 0 of the first data unit DU0 and/or μ slot 0 of the first address unit AU0 or the general unit GU. Similarly, an instruction in slot 1 can give rise to an instruction in μ slot 1 of the second data unit DU1 and/or the second address unit AU1 or general unit GU.

In VLIW mode, slot 0 and 1 are used to generate micro-instructions for μ slot 0 and μ slot 1 of either the A-IDQ or the D-IDQ, and slots 2 and 3 are used to generate micro-instructions for µ slot 0 and µ slot 1 of the other execution units. For programmes written in VLIW mode, a grammar has to be followed such that only certain 32 bit instructions can be placed as part of the combination of all instructions to be fetched and decoded simultaneously. Thus, it is not possible to generate from a single VLIW word of four 32 bit instructions four instructions requiring use of the data unit. The most micro-instructions that can, be generated from a single VLIW word are two micro-instructions for the parallel data units DU0 and DU1 and two micro-instructions for the parallel address units AU0 and AU1 or the general unit GU.

Figure 3:
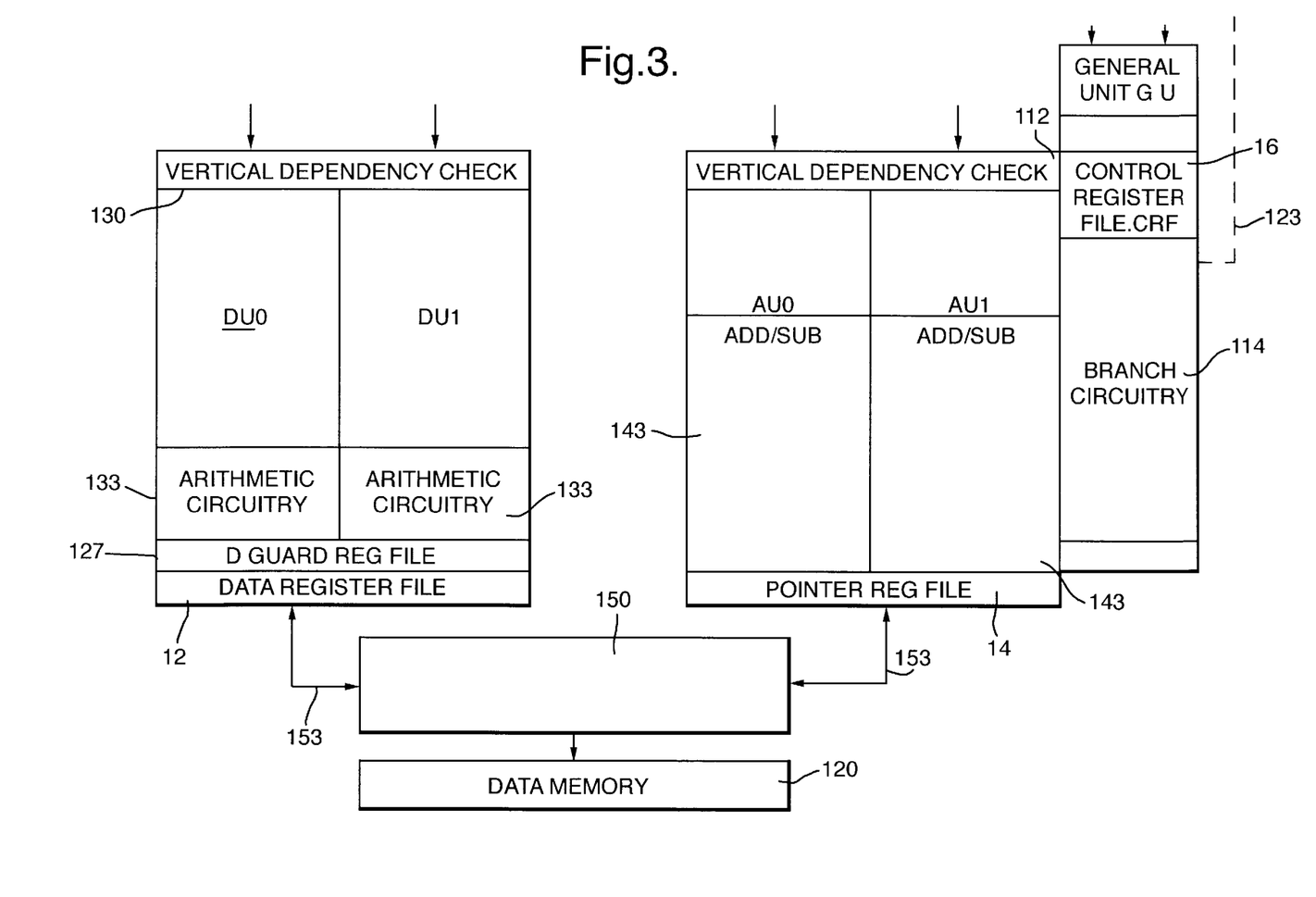
FIG. 3 shows the address units and general unit of FIG. 1 in more detail.

Reference will now be made to FIG. 3 which shows the structure of the data units DU1 and DU0 as the address units AU1 and AU0.

The data units DU0 and DU1 are arranged to execute instructions carrying arithmetic operations. The address units AU0 and AU1 are arranged to execute instructions for memory accesses to a data memory 120. µ slots 0 and 1 for the address unit AU0 and AU1 may also be used to supply instructions to the general unit GU which shares some resources with the address units AU0 and AU1. The general unit GU includes the control register file 16 as well as branch circuitry 114 which is used to provide instruction branch information on line 123 to the control unit.

The data units DU0 and DU1, as mentioned hereinbefore, share a common data register file 12. The data unit DU0 and DU1 also share a common guard register file 127 holding master guard values which may be associated with the instructions. The instructions received by the respective data units DU0 and DU1 from the D-IDQ are checked for data dependencies by a common vertical dependency check circuit 130. The sequence of operations in each of the data units DU0 and DU1 include an operand fetch usually accessing one of the register files 12 or 127 followed by execution stages which may use arithmetic circuitry 133 followed by a data write stage at which the result of an arithmetic operation is returned to the register file 12 and 127. Similar stages take place in both of the data units DU0 and DU1.

Similarly, for the address units AU0 and AU1, both address units AU0 and AU1 access the common register file 16 holding pointer values for use in load or store operations in the data memory 20. These two address units AU0 and AU1 each take their instructions from the A-IDQ and a similar vertical dependency check 112 is provided in common for both of the address units AU0 and AU1. In executing instructions through the two address units AU0 and AU1, accesses will be made to the pointer register file 14. Add and subtract units 143 provided in each of the address units may be used in the execution of the instructions. Each of the address units AU0 and AU1 include an operand fetch stage followed by an execution stage and an address write back stage.

Block 150 includes the data memory interface control and the various queues LDQ, PDQ, SAQ, SDQ and DDQ shown in FIG. 1. This block 150 is connected to by a bi-direction bus 153 to both the data units DU0 and DU1 and both the address units AU0 and AU1.

When instructions are executed to load data from the data memory 120 into the data register files 12 of the data units DU0 and DU1, the address unit AU0 and AU1 will access the data memory 120 and load the required data into the load data queues LDQ prior to completing the update of the data register files 12 by transferring the data from the appropriate queue. Similarly, when instructions are executed to store data from the data units DU0 and DU1 into the data memory 120 the appropriate data may be held in the store data queues SDQ together with the store addresses in the SAQ prior to completing the store operation in the data memory 120.

Figure 4:
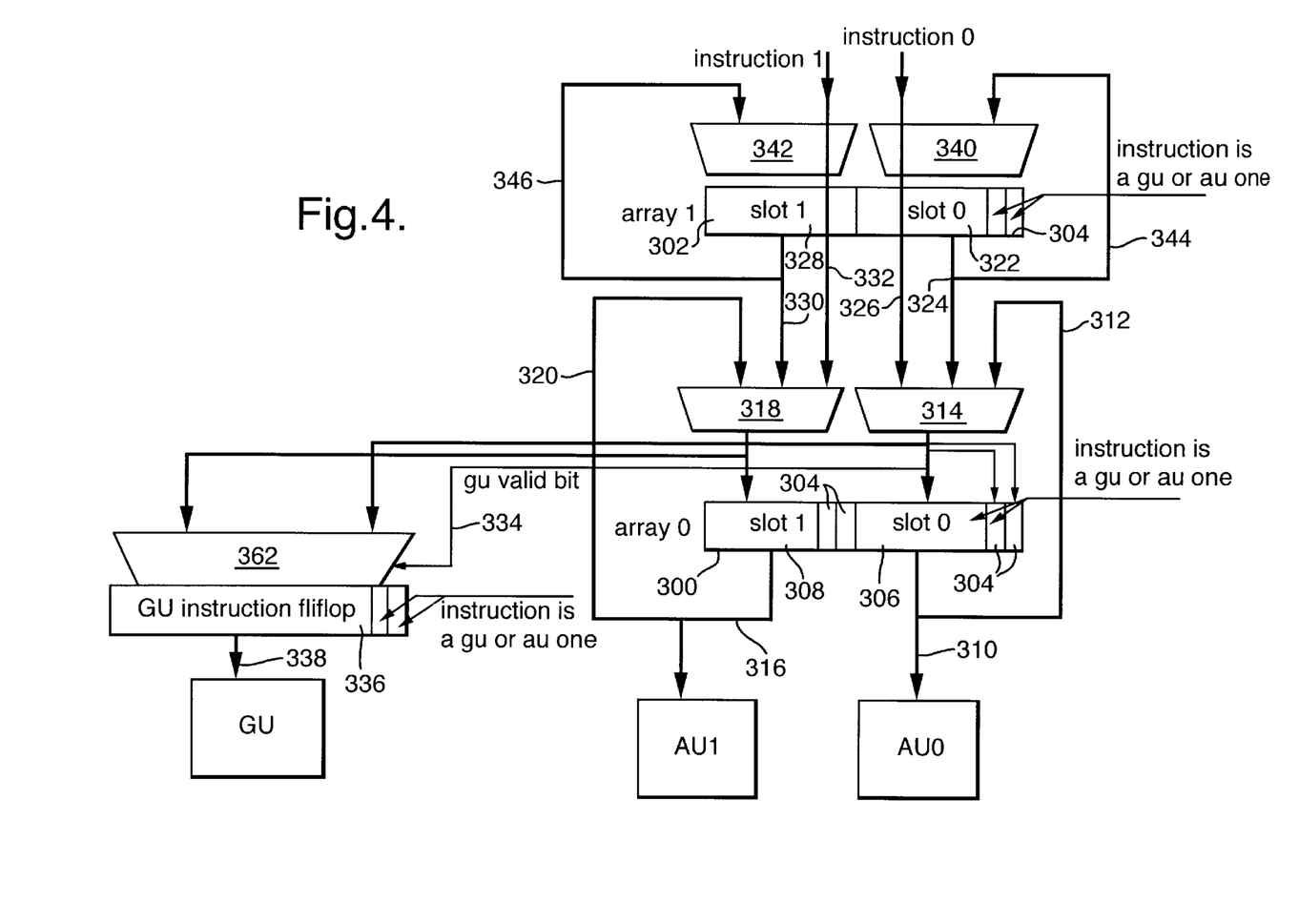
FIG. 4 shows an arrangement embodying the present invention whereby the address units and the general unit are able to share a common first-in-first-out buffer.

Reference will now be made to FIG. 4 which shows how the address units AU0 and AU1 and the general unit GU share the same A-IDQ. The A-IDQ is a FIFO which comprises a number of arrays. In FIG. 4, the first array 300 and the second array 302 are shown. As the A-IDQ is a FIFO, the instructions in array zero will be actioned first by the respective address units AU0 and AU1 and the general unit. The instructions included in the next array 302 will be actioned at a subsequent time.

Each array 300 and 302 comprises an identification slot 304 which are used to indicate if the instructions are for the address units AU0 and AU1 or if the instructions are for the general unit GU. Each slot 304 contains two bits: a AU-valid bit for the address unit and a GU-valid bit for the general unit. One or other of these bits are set if the instruction in the slot is dedicated to a respective execution unit. If there is no valid bit, this means that there is no instruction contained in the associated array. If the slots 304 indicates that the instructions are for the address units AU0 and AU1, the instructions contained in the first µ slot 306 will be for the first address unit AU0 and the instructions in the second µ slot 308 will be for the second address unit AU1.

On the other hand, the slots 304 may indicate that one instruction is intended for the general unit GU and the other instruction is for an address unit. The instruction for the first and second address units AU0 and AU1 may arrive at the first array 300 at the same time or at different times. One or other of the slots may be empty. The instructions in the first and second arrays will not both be for the general unit at the same time.

The first µ slot 306 of the first array 300 is connected via connection 310 to the first address unit AU0. The first slot 306 of the first array 300 is also connected via connection 312 to a first multiplexer 314 which will be described in more detail hereinafter. In a similar way, the output of the second µ slot 308 of the first array 300 is connected via connection 316 to the second address unit AU1 and to a second multiplexer 318 via connection 320.

The output of the first multiplexer 314 is connected to the first µ slot 306 of the first array 300. The first multiplexer 314 receives two further inputs. The first of these further inputs is from the first µ slot 322 of the second array 302 and is via connection 324. The second further input is via connection 326 which allows the next available instruction for the first µ slot 306 of the first array 300 to be input to the first multiplexer 314 if that instruction is not contained in the preceding array i.e. the second array 302. Similarly, the second multiplexer 318 receives an input from the second µ slot 328 of the second array 302 via connection 330. Likewise the next instruction for the second µ slot 308 of the first array 300 can be input directly to the multiplexer 318 if it is not contained in the preceding array, i.e. the second array 302.

The output of the first multiplexer 314 is also input to a third multiplexer 362 as is the output from the second multiplexer 318. The third multiplexer 362 receives a control signal 334. This control signal is derived from the output of the first multiplexer and second multiplexers 314 and indicates if the output of the first and second multiplexers 314 and 318 contains instructions for the general unit GU. This is determined from the information contained in the information slots 304. If the output of the first and second multiplexers 314 and 318 contain instructions for the general unit then the third multiplexer will be controlled to pass the output of the first and second multiplexers 314 and 318.

It should be appreciated that the ordering of instructions is maintained. In embodiments of the invention, instructions for the general unit are not provided in both slots at the same time. Therefore, the third multiplexer 362 is directly driven by the associated GU valid bit output by the first multiplexer or the second multiplexer. Indeed, if the third multiplexer 362 output is a general unit instruction, the GU valid bit will be set. The instruction stored in the flip flop 336 will then be the output of the first or second multiplexer 314 or 318 respectively. If neither of the instructions is a GU instruction, the GU valid bit will not be set in either of the relevant slots. As a result, the output from the second multiplexer 318 will be stored in flip flop 336.

A GU instruction will be stored in the flip flop 336 (if one instruction from one of the first and second multiplexers 314, 318 is a general unit instruction). If there is no general unit instruction, the output of the second multiplexer 318 is stored in the flip flop 336 but the instruction will be ignored and will not be used by the general unit.

The third multiplexer 362 has its output connected to the flip flop 336 which acts as a temporary store. As will be described in more detail, the flip flop 336 stores the instructions output from the first and second multiplexers 314 and 318 along with information slot information if the instructions are general unit GU instructions. The output of that flip flop 336 is connected via connection 338 to the general unit GU.

As can be seen, the output of the first and second multiplexers 314 land 318 can be supplied both to the first array 300 and to the third multiplexer 362.

Fourth and fifth multiplexers 340 and 342 are also provided. The fourth multiplexer 340 receives the contents of the first $\mu$ slot 322 of the second array 302 via connection 344. Likewise, the fifth multiplexer 342 receives the contents of the second $\mu$ slot 328 of the second array 302 via connection 346. The fourth and fifth multiplexers 340 and 342 may also receive the respective outputs of the preceding array via connections which are not shown.

Figure 7:
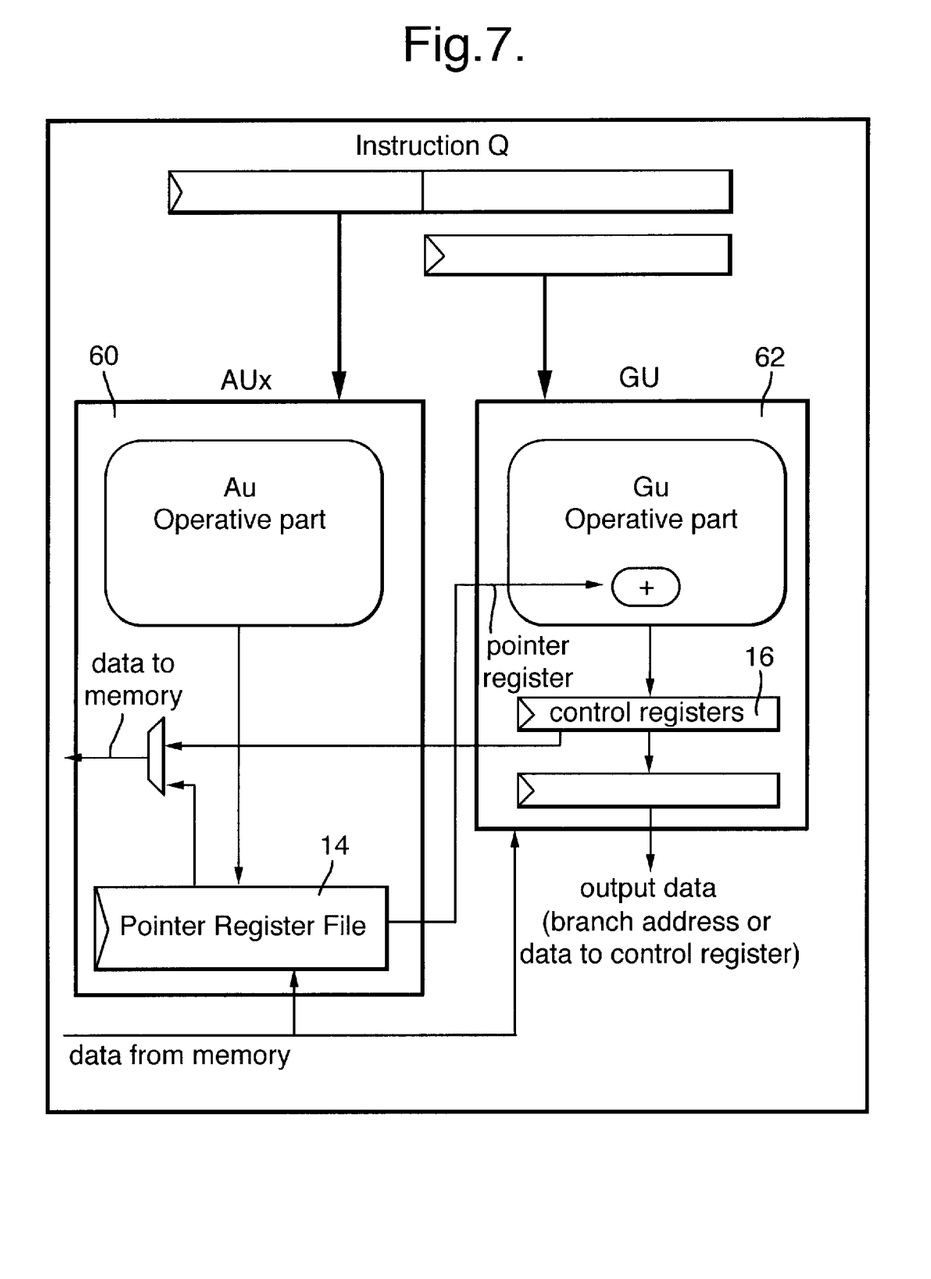
FIG. 7 shows the relationship between one address unit and a general unit.

Reference is now made to FIG. 7 which is a block diagram of an address unit 60 and a general unit 62. The address unit 60 is dedicated to load and store access. The pointer register files 14 are provided in order to generate addresses with a set of arithmetic instructions. It is then possible to generate any address in the address unit. The address unit also provides requests to a memory for load and store and receives data from the memory 120 (see FIG. 5) for both the pointer registers 14 in the address unit and control registers 16 in the general unit 62. The address unit also sends data to the memory 120 for both the pointer register file 14 and the control register 66.

The general unit 62 is an execution unit which deals with branch and control registers. The general unit 62 is able to generate any branch target address, that being the reason why it shares some of the same registers with the address unit 60. Calculations between pointer registers can be used to generate target addresses. The general unit uses the address unit instruction despatch queue. As there is only one general execution unit, compared to the two address units, the multiplexer is required as discussed hereinbefore.

The operation of the arrangement shown in FIG. 4 will now be described.

Consider the point where the contents of the second array 302 are input to the first and second multiplexers 314 and 318 to be input to the $\mu$ slots 306 and 308 of the first array 300. The output from the respective slots of the second array 302 are input to the first and second multiplexers 314 and 318. If the second array 302 is empty, received instructions will be input directly to the first and second multiplexers 314 and 318 via connections 326 and 332. The contents of these multiplexers 314 and 318 are input to the first array 300 regardless of the type of instruction. The contents of the first and second multiplexers 314 and 318 are also presented to the third multiplexer 362. If the third multiplexer 362 is enabled by the control signal the outputs from the first and second multiplexers 314 and 318 will be output to the flip flop 336.

The instructions from the first and second $\mu$ slots 306 and 308 of the first array 300 are then input to the respective address units AU0 and AU1. If the instructions contained now in the first array 300 are for the address units AU0 and AU1, the address units act on the instructions from the respective slots 306 and 308 and perform the necessary operation. If on the other hand, the instructions contained in the first array 300 are not for the address units AU0 and AU1, the address units AU0 and AU1 will disregard those instructions. The address units AU0 and AU1 use the information contained in the information slots 304 to identify instructions for the address units AU0 and AU1.

The instruction, if not an address unit instruction will be for the general unit GU. Accordingly, the instruction will be taken from the flip flop 336 by the general unit and will be acted on by the general unit GU. If there are no instructions in the flip flop 336, the general unit GU will take no action.

The general unit GU will have its next instruction available at the beginning of a clock cycle so the instruction can be acted on in the minimum number of clock cycles. This is clearly of advantage in a pipelined system. This contrasts with the arrangement shown in FIG. 5 where the third execution unit does not have the next instruction available until part way through a clock cycle.

What is claimed is:

1. A system comprising:
   a first execution unit, a second execution unit and a third execution unit;
   a first-in-first-out memory arranged to receive one or more instructions, said first-in-first-out memory including at least a first memory array to store said one or more instructions and to output said one or more instructions from said first-in-first-out memory such that said one or more instructions are available to at least one of said first and second execution units at a first time;
   memory store circuitry to store at least one instruction of said one or more instructions and to provide said at least one instruction to said third execution unit; and
   connection circuitry connecting said memory store circuitry to said first-in-first-out memory to provide said at least one instruction to said memory store circuitry in parallel to said one or more instructions being provided to said at least first memory array,
   wherein said at least one instruction is available to said third execution unit at substantially the same time as said first time.

2. The system of claim 1, wherein the at least one memory array receives the one or more instructions.

3. A system as claimed in claim 1, wherein the at least first memory array comprises a first slot and a second slot, each of which is able to store a separate instruction.

4. A system as claimed in claim 3, wherein the first slot is operable to hold an instruction for said first execution unit and the second slot is operable to hold an instruction for said second execution unit.

5. A system as claimed in claim 3, wherein said third execution unit is arranged to receive instructions sent to said first and second slots.

6. A system as claimed in claim 5, wherein an instruction for said third execution unit comprises instructions in said first and second slots.

7. A system as claimed in claim 3, wherein at least one of said first and second slots contains information identifying the execution unit for which the instruction is intended.

8. A system as claimed in claim 1, wherein the first-in-first-out memory includes a second memory array and a switch means provided between the at least first memory array and the second memory array, said switch means operable to provide the one or more instructions to said first memory array and to provide the at least one instruction to said memory store circuitry.

9. A system as claimed in claim 8, wherein said switch means comprises at least one multiplexer.

10. A system as claimed in claim 9, wherein said at least one multiplexer is connected to a first slot of the first array and said switch means includes a second multiplexer connected to a second slot of the first array.

11. A system as claimed in claim 10, wherein an output of said at least one multiplexer and an output of said second multiplexer are connected to one or more inputs of said memory store circuitry.

12. A system as claimed in claim 8, wherein the memory store circuitry comprises a further switch means and a memory store, and where the output of said switch means is arranged to be input to the further switch means, the output of which is connected to said memory store, said further switch means being arranged to pass only instructions intended for said third execution unit to said memory store.

13. A system as claimed in claim 12, wherein said further switch means comprises a multiplexer.

14. A system as claimed in claim 1, wherein said memory store circuitry is arranged to store only a single instruction.

15. A system as claimed in claim 14, wherein said memory store circuitry comprises a flip flop.

16. A system as claimed in claim 1, wherein said execution units are arranged to carry out pipelined operations in accordance with the instructions.

17. A system as claimed in claim 1, wherein said first and second execution units are of one type and said third execution unit is of a second, different type.

18. A system as claimed in claim 1, wherein instructions for said first, second and third execution units are available at the beginning of a clock cycle.

19. An integrated circuit incorporating a system, said system comprising:
    a first execution unit, a second execution unit and a third execution unit;
    a first-in-first-out memory arranged to receive one or more instructions, said first-in-first-out memory including at least a first memory array to store the one or more instructions and to output the one or more instructions from the first-in-first-out memory such that said one or more instructions are available to at least one of said first and second execution units at a first time;
    memory store circuitry to store at least one instruction of said one or more instructions and to provide said at least one instruction to said third execution unit; and
    connection circuitry connecting said memory store circuitry to said first-in-first-out memory to provide said at least one instruction to said memory store circuitry in parallel to said one or more instructions being provided to said at least first memory array,
    wherein said at least one instruction is available to said third execution unit at the substantially same time as said first time.

20. The system of claim 1, wherein the memory store circuitry comprises a switching means.

21. The system of claim 1, wherein the memory store circuitry comprises a memory store.

22. The system of claim 1, wherein the memory store circuitry comprises information slots.

23. The system of claim 1, wherein the first-in-first-out memory comprises first circuitry having one or more inputs to receive the one or more instructions and one or more outputs to output the one or more instructions.

24. The system of claim 23, wherein the first circuitry provides the at least one instruction to the connection circuitry.

* * * * *